(12) United States Patent
West

(10) Patent No.: US 12,483,832 B2
(45) Date of Patent: Nov. 25, 2025

(54) WIRELESS AUTOMOBILE AUDIO SYSTEM

(71) Applicant: EVolveAudio LLC, Layton, UT (US)

(72) Inventor: Matthew West, Layton, UT (US)

(73) Assignee: EVolveAudio LLC, Layton, UT (US)

( * ) Notice: Subject to any disclaimer, the term of this patent is extended or adjusted under 35 U.S.C. 154(b) by 208 days.

(21) Appl. No.: 18/237,549

(22) Filed: Aug. 24, 2023

(65) Prior Publication Data

US 2024/0073603 A1    Feb. 29, 2024

Related U.S. Application Data

(60) Provisional application No. 63/400,598, filed on Aug. 24, 2022.

(51) Int. Cl.
*H04R 3/12* (2006.01)
*G06F 3/16* (2006.01)

(52) U.S. Cl.
CPC ............ *H04R 3/12* (2013.01); *G06F 3/165* (2013.01); *H04R 2420/01* (2013.01); *H04R 2420/07* (2013.01); *H04R 2430/00* (2013.01); *H04R 2499/13* (2013.01)

(58) Field of Classification Search
CPC .. H04R 3/12; H04R 2420/01; H04R 2420/07; H04R 2430/00; G06F 3/165
See application file for complete search history.

(56) References Cited

U.S. PATENT DOCUMENTS

| | | |
|---|---|---|
| 6,731,761 B1 | 5/2004 | Zablocki et al. |
| 8,059,830 B1 | 11/2011 | Gleason et al. |
| 9,301,031 B2 | 3/2016 | Gengler et al. |
| 10,097,922 B2 | 10/2018 | Fathollahi |
| 2004/0234081 A1 | 11/2004 | Brice et al. |
| 2014/0032014 A1 | 1/2014 | DeBiasio et al. |
| 2017/0251305 A1 | 8/2017 | Fathollahi |
| 2021/0237659 A1* | 8/2021 | Ludwig .................. H04R 9/022 |

OTHER PUBLICATIONS

Dave Dalamere; "What are line output converter?"; Jun. 2017; Crutchfield.*

* cited by examiner

*Primary Examiner* — David L Ton
(74) *Attorney, Agent, or Firm* — Suiter Swantz IP

(57) ABSTRACT

A wireless audio system may include a transmitter unit and one or more battery-powered speaker units. The transmitter unit may receive audio signals from a head unit of a vehicle, be powered by the vehicle, and include wireless communication circuitry configured to wirelessly transmit the audio signals. The one or more battery-powered speaker units may be powered by one or more batteries during operation and may include additional wireless communication circuitry configured to receive the audio signals from the transmitter unit, one or more amplifiers to amplify the audio signals, and one or more speakers configured to produce sound based on the audio signals.

24 Claims, 7 Drawing Sheets

WIRELESS AUTOMOBILE AUDIO SYSTEM

CROSS-REFERENCE TO RELATED APPLICATION

The present application claims the benefit under 35 U.S.C. § 119(e) of U.S. Provisional Application Ser. No. 63/400,598, filed Aug. 24, 2022, entitled WIRELESS AUTOMOBILE AUDIO SYSTEM, naming Matthew West as inventor, which is incorporated herein by reference in the entirety.

TECHNICAL FIELD

The present disclosure relates to audio systems, and more particularly, to audio systems with battery-powered speaker units.

BACKGROUND

The current car audio aftermarket lacks the ability to safely add on to the audio system of many hybrids and electric vehicles due to the different ways these vehicles generate power for the control systems.

In a typical internal combustion engine (ICE) vehicle, an alternator is driven via a belt off the crankshaft of the engine. These alternators are typically sized to operate the full suite of the factory-installed electrical devices with a percentage of headroom at engine idle speed. However, the output of the alternator increases with increased engine speed during normal driving and is thus typically sufficient to power an additional load associated with aftermarket upgraded audio equipment. Further, many aftermarket audio equipment installations require a dashboard of a vehicle to be dismantled in order to add custom wiring created at the time of installation, increasing the complexity of the installation.

In contrast, electric vehicles (EVs) typically do not have an alternator and hybrid vehicles typically do not have an alternator large enough to sufficiently power upgraded vehicle audio. As a result, the power systems in such vehicles may be insufficient to support aftermarket audio equipment, particularly aftermarket audio equipment with higher power requirements. Further, EVs and hybrids typically include a head unit or "info-tainment system" that displays and/or controls critical information for the vehicle (e.g., information about the drive system, battery metrics, or the like), which further complicates the installation of typical aftermarket audio systems requiring integrated control options.

There is therefore a need to develop systems and methods to cure the above deficiencies.

SUMMARY

A wireless audio device is disclosed in accordance with one or more illustrative embodiments of the present disclosure. In one illustrative embodiment, the device includes a transmitter unit configured to receive audio signals from a head unit of a vehicle, where the transmitter unit is configured to be powered by the vehicle, and where the transmitter unit includes wireless communication circuitry configured to wirelessly transmit at least a portion of the audio signals to one or more battery-powered speaker units. In another illustrative embodiment, at least one of the battery-powered speaker units includes additional wireless communication circuitry configured to receive the audio signals from the transmitter unit, one or more amplifiers to amplify the audio signals, and one or more speakers configured to produce sound based on the audio signals.

A battery-powered speaker unit is disclosed in accordance with one or more illustrative embodiments of the present disclosure. In one illustrative embodiment, the unit includes one or more batteries to provide power during operation. In another illustrative embodiment, the unit includes wireless communication circuitry configured to receive audio signals from a transmitter unit, where the transmitter unit is configured to receive audio signals from a head unit of a vehicle. In another illustrative embodiment, the unit includes one or more amplifiers to amplify the audio signals. In another illustrative embodiment, the unit includes one or more speakers configured to produce sound based on the audio signals.

A wireless audio system is disclosed in accordance with one or more illustrative embodiments of the present disclosure. In one illustrative embodiment, the system includes a transmitter unit configured to receive audio signals from a head unit of a vehicle, wherein the transmitter unit is configured to be powered by the vehicle, where the transmitter unit includes wireless communication circuitry configured to wirelessly transmit the audio signals. In another illustrative embodiment, the system includes one or more battery-powered speaker units, each powered by one or more batteries during operation. In another illustrative embodiment, at least one of the one or more battery-powered speaker units includes additional wireless communication circuitry configured to receive the audio signals from the transmitter unit, one or more amplifiers to amplify the audio signals, and one or more speakers configured to produce sound based on the audio signals.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
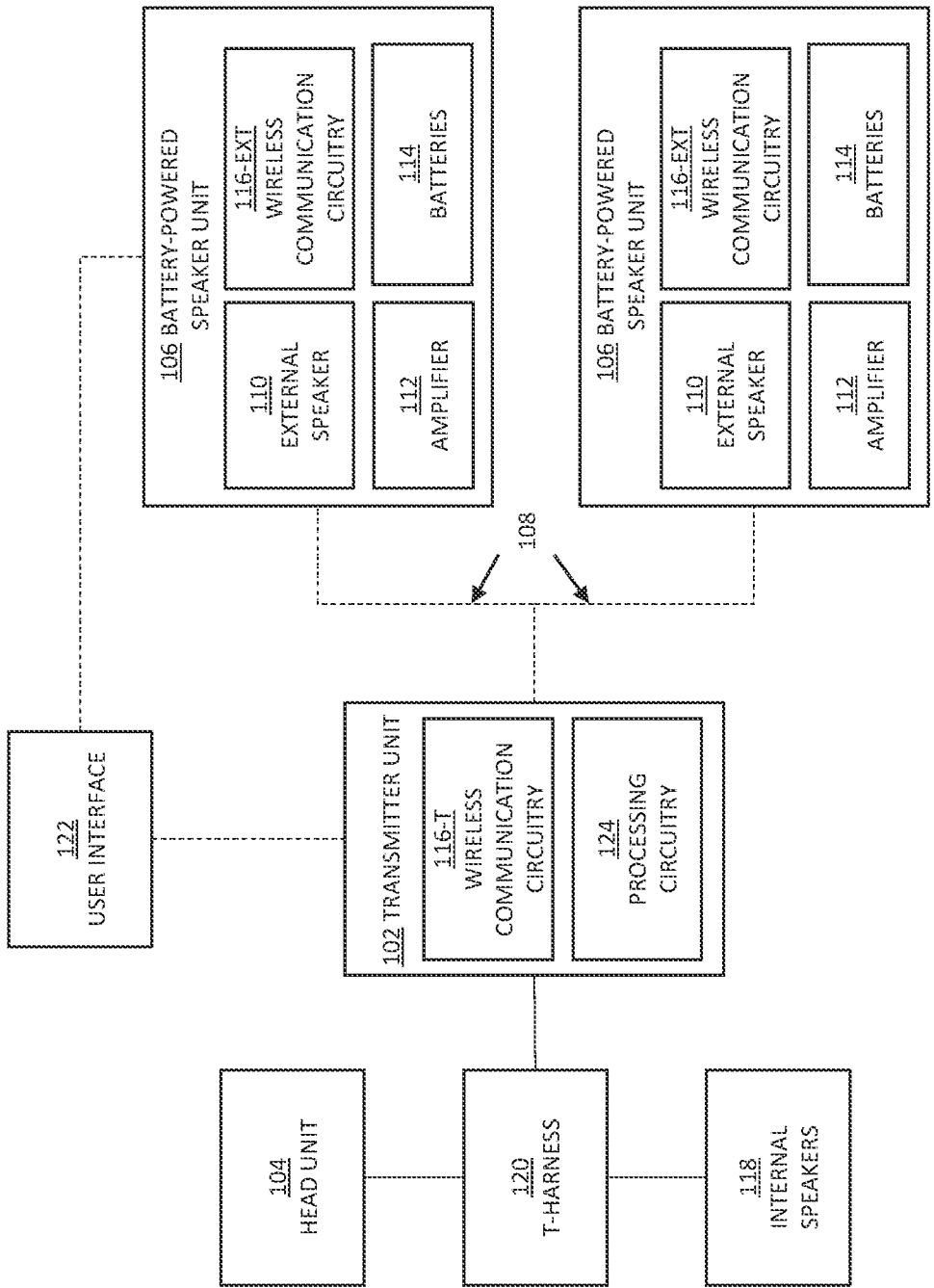
FIG. 1 is a block diagram view of a wireless vehicle audio system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing an aftermarket vehicle audio system suitable for a wide range of vehicles including, but not limited to, electric vehicles (EVs) or hybrid vehicles.

In some embodiments, a wireless vehicle audio system includes a transmitter unit that may be coupled to a head unit and factory-installed speakers in a vehicle (e.g., with a T-harness), where the transmitter unit is further wirelessly coupled to battery-powered speaker units. The battery-powered speaker units may include any type of speakers including, but not limited to, a subwoofer, a tweeter, or a speaker with a full dynamic range. The battery-powered speakers may be placed in any convenient location within wireless range of the transmitter unit such as, but not limited to, a trunk of the vehicle or outside the vehicle (e.g., when parked at a campsite or outdoor venue). The battery-powered speakers may further include additional audio equipment such as, but not limited to, amplifiers, digital signal processors (DSPs), or equalizers that are also powered by the batteries.

As an illustration, a user may control audio playback using a pre-existing head unit, which may be played on the pre-existing speakers (referred to herein as internal speakers). However, the wireless vehicle audio system may further receive audio signals via the T-harness (referred to herein as native audio signals) and wirelessly transmit associated audio signals to the battery-powered speaker units for playback. In this way, the battery-powered speaker units may supplement the pre-existing speakers to provide an upgraded audio experience without requiring substantive power draw from the vehicle.

In some embodiments, the wireless vehicle audio system provides synchronous audio playback between any or all speakers by introducing delays to audio signals sent to certain speakers, which may be referred to as buffering. For example, the transmitter unit may provide delays to audio signals sent to internal speakers to compensate for latency associated with wireless transmission to the battery-powered speaker units and/or delays to individual battery-powered speaker units to compensate for different latencies between different units.

In some embodiments, the wireless vehicle audio system further provides a user interface to control various aspects of the audio playback on the battery-powered speaker units. For example, the user interface may allow a user to adjust parameters such as, but not limited to, volume levels of individual speakers or groups of speakers, amplification settings, equalizer settings, delay settings (e.g., synchronization settings), or the like. As another example, the user interface may allow a user to view battery life or other performance metrics. The control interface may be implemented via an application for a mobile device (e.g., a mobile phone, a tablet, or the like) connected to the wireless vehicle audio system and/or via dedicated hardware.

Notably, the wireless vehicle audio system disclosed herein may provide enhanced audio functions and/or upgraded sound quality without requiring permanent modifications to the vehicle (e.g., to the head unit and/or the dashboard) or the installation of a mount.

It is recognized herein that existing solutions providing modular and/or portable audio equipment in a vehicle typically either operate independent of internal speakers in the vehicle or need to be electrically connected to the vehicle either directly or through a mount to provide power and audio signals. Existing vehicle audio systems are generally described in U.S. Pat. No. 6,731,761 issued on May 4, 2004, U.S. Pat. No. 9,301,031 issued on Mar. 29, 2016, U.S. Pat. No. 10,097,922 issued on Oct. 9, 2018, U.S. Patent Publication No. 2004/0234081 published on Nov. 25, 2004, and U.S. Patent Publication No. 2014/0032014 published on Jan. 30, 2014, all of which are incorporated herein by reference in their entireties.

For example, existing systems may wirelessly connect to a portable speaker through Bluetooth or another protocol, but may not synchronize this audio with internal speakers in the vehicle. As another example, existing systems may utilize a mount that is electrically connected to the vehicle to provide power and audio signals to speakers that may be removably inserted into the mount. However, such systems are limited by the available power headroom of the vehicle and may thus provide limited performance.

In contrast, the wireless vehicle audio system as disclosed herein provides or supports self-sufficient battery-powered speaker units that do not draw power from the vehicle during operation (e.g., are battery-powered during operation) and thus are limited only by the performance specifications of the batteries used. Further, the transmitter unit connected by a simple T-harness may provide synchronous audio between both internal speakers and the battery-powered speaker units to provide a substantially better audio experience with little power draw from the vehicle.

Further, the wireless vehicle audio system disclosed herein may be easily customizable and/or updatable by a user. In particular, both the transmitter unit and any battery-powered speaker units may be easily updated. For example, initial installation may simply require the installation of a T-harness between the head unit and internal speakers of the vehicle, placement of the transmitter unit in a suitable location under or outside of the dash, and pairing the transmitter unit with any number of battery-powered speaker units. A user may then upgrade the transmitter unit (e.g., to a different model with different functionality) by the same process. Further, a user may simply place any desired combination of battery-powered speaker units in or around the vehicle as desired. In this way, the user may upgrade a battery-powered speaker unit simply by pairing a new unit (e.g., with better performance specifications) with the transmitter unit.

Referring now to FIGS. 1-4, systems and methods providing a wireless vehicle audio system 100 are described in greater detail, in accordance with one or more embodiments of the present disclosure.

FIG. 1 is a block diagram view of a wireless vehicle audio system 100, in accordance with one or more embodiments of the present disclosure.

In some embodiments, the wireless vehicle audio system 100 includes a transmitter unit 102 configured to couple via electronic wiring to a head unit 104 of a vehicle (not shown) to receive audio signals and further configured to transmit corresponding audio signals to one or more battery-powered speaker units 106 over one or more wireless communication channels 108 for audio playback.

A battery-powered speaker unit 106 may include one or more external speakers 110 (e.g., drivers) as well as components suitable for transforming wireless audio signals received over the wireless communication channels 108 into signals suitable for driving the external speakers 110 to produce sound such as, but not limited to, an amplifier 112. An external speaker 110 incorporated into a battery-powered speaker unit 106 may include any type of speaker known in the art having any dynamic range such as, but not limited to, a subwoofer, a tweeter, or a full-range speaker. For example, a subwoofer may be suitable for relatively low audio frequencies such as, but not limited to, frequencies of 100 Hz or lower. As another example, a tweeter may be suitable for relatively high audio frequencies such as, but not limited to, frequencies of 5 kHz or higher. As another example, a full-range speaker may be suitable for a wide range of audio frequencies. For instance, a full-range speaker may provide an audio range in a range of 100 Hz to 20 kHz, though it is to be understood that this is merely an illustration and not limiting.

A battery-powered speaker unit 106 may further include any number of external speakers 110 of any type or combination of types. A battery-powered speaker unit 106 may further include one or more batteries 114 to provide power for all internal components.

The transmitter unit 102 and the battery-powered speaker units 106 may each include wireless communication circuitry 116 suitable for transmitting and/or receiving data over the wireless communication channels 108 that may include, but is not limited to, audio signals representative of sound to be produced by the battery-powered speaker units 106, control signals or status signals. For example, a control signal may include an operational commands directing the transmitter unit 102 and/or the battery-powered speaker units 106 to adjust an operational status such as, but not limited to, power status, a pairing status, volume, amplification, or a delay (e.g., a synchronization delay). As another example, a status signal may include an indication of operational status such as, but not limited to, a power status, a pairing status, volume, amplification, or a delay (e.g., a synchronization delay). The wireless communication circuitry 116 for the transmitter unit 102 and the battery-powered speaker units 106 are labeled in FIG. 1 as wireless communication circuitry 116-T and wireless communication circuitry 116-EXT, respectively.

The transmitter unit 102 may further be configured to be coupled with internal speakers 118 installed in the vehicle. For example, as illustrated in FIG. 1, the transmitter unit 102 may be configured to couple with the head unit 104 and/or the internal speakers 118 via a T-harness 120. In this way, the battery-powered speaker units 106 may supplement or in some cases replace the internal speakers 118. Further, the transmitter unit 102 may in some cases further manipulate the audio signals sent to the internal speakers 118.

For the purposes of the present disclosure, the internal speakers 118 refer to any speakers that may be directly addressable by the head unit 104, whereas the external speakers 110 refer to any speakers that are not directly addressable by the head unit 104. For example, the internal speakers 118 may be factory-installed speakers or aftermarket speakers that are typically electrically wired to the vehicle. In contrast, the external speakers 110 may be addressable only by the transmitter unit 102.

In some embodiments, the wireless vehicle audio system 100 includes or is otherwise controllable by a user interface 122. The user interface 122 may include any components suitable for displaying information to a user and/or receiving input from a user. For example, the user interface 122 may include or be implemented on a touchscreen device, a display screen, or physical controls (e.g., knobs, buttons, or the like).

The user interface 122 may display data and/or accept input regarding any aspect or components of the wireless vehicle audio system 100. For example, the user interface 122 may display status information and/or accept user input regarding various components such as, but not limited to, pairing options for battery-powered speaker units 106 within wireless range, connectivity status of paired battery-powered speaker units 106, operational status of battery-powered speaker units 106, battery levels of battery-powered speaker units 106, power drain of battery-powered speaker units 106, estimated time remaining of battery-powered speaker units 106 based on battery levels and/or power drain, or whether to play audio on the internal speakers 118. As another example, the user interface 122 may display status information and/or accept user input regarding audio settings associated with audio playback on any of the internal speakers 118 and/or battery-powered speaker units 106 such as, but not limited to, relative volume levels, equalization settings, fade settings, amplification settings, or synchronization settings (e.g., delays to selected components designed to synchronize audio playback on all connected speakers).

Further, the user interface 122 may generally be connected to the transmitter unit 102 and/or any of the battery-powered speaker units 106. It is noted that a connection to the transmitter unit 102 may beneficially provide connectivity regardless of which battery-powered speaker units 106 are connected at any given time. However, a connection to a battery-powered speaker unit 106 may offer extended range in some cases and/or operate as a bridge to the transmitter unit 102. In some embodiments, the user interface 122 is implemented on hardware that is electrically connected to the transmitter unit 102 and/or a battery-powered speaker unit 106 (e.g., by wiring). For example, the user interface 122 may include a touchscreen device to be placed or mounted within the vehicle. In some embodiments, the user interface 122 is implemented on hardware that is wirelessly connected to the transmitter unit 102 and/or a battery-powered speaker unit 106 (e.g., by wiring). For example, the user interface 122 interface may be implemented as an application installed on a mobile device such as, but not limited to, a phone or a tablet.

It is contemplated herein that wireless vehicle audio system 100 may provide a flexible, modular, and easily upgradeable audio system that may be installed in a wide variety of vehicles including, but not limited to, EVs or hybrid vehicles with limited power headroom available for connected devices.

For example, the wireless vehicle audio system 100 enables the installation of high-power audio equipment into a vehicle without relying on the power system of the vehicle. In particular, high-power components such as, but not limited to, an amplifier 112 may be located within battery-powered speaker units 106 and thus do not draw power from the vehicle. Further, the transmitter unit 102 may be a relatively low power device that may draw power from the vehicle (e.g., via the T-harness 120), but may be within the power headroom of the vehicle, even an EV or a hybrid vehicle with relatively low power headroom.

As another example, the battery-powered speaker units 106 do not need to be physically connected or integrated with the vehicle (e.g., either directly or via a mount) and may be placed at any suitable location such as, but not limited to, a trunk, on floor panels, or beneath seats. Put another way, the battery-powered speaker units 106 may be electrically isolated from the vehicle and may not draw power from the vehicle (at least during normal operation). Further, battery-powered speaker units 106 may be removed or rearranged as desired. As an illustration, it is recognized that some high-powered and/or high-performance audio gear may be relatively large and/or heavy. The wireless vehicle audio system 100 may allow a user to selectively place a battery-powered speaker unit 106 in the vehicle when desired to provide an enhanced audio experience and selectively remove the battery-powered speaker unit 106 when desired. For instance, the user may remove relatively large and/or heavy battery-powered speaker units 106 to increase gas mileage, decrease weight (e.g., for racing purposes), or increase storage capacity.

Additionally, a battery-powered speaker unit 106 may generally be placed at any location inside or outside the vehicle within wireless transmission range. In this way, the battery-powered speaker units 106 are not limited to products typically used for vehicle applications, but may rather include products suitable for portable and/or outdoor applications. For example, a battery-powered speaker unit 106 may include at least one full-range speaker suitable for audio playback in an outdoor environment such as, but not limited to, a campsite or other outdoor venue. Further, such a battery-powered speaker unit 106 may be a standalone device or may be integrated within other objects such as, but not limited to, a cooler, a chair, a table, or the like.

The wireless vehicle audio system 100 may further simultaneously support multiple battery-powered speaker units 106. In this way, the wireless vehicle audio system 100 may provide a flexible multi-speaker audio environment utilizing audio signals provided by the head unit 104 of a vehicle.

The operation of the wireless vehicle audio system 100 will now be described in greater detail, in accordance with one or more embodiments of the present disclosure.

Audio signals for playback on any combination of internal speakers 118 and connected battery-powered speaker units 106 may be provided by the head unit 104 of the vehicle. In this way, the head unit 104 may include any component or combination of components in a vehicle that provides audio signals and/or power to the internal speakers 118 within the vehicle. In some embodiments, the head unit 104 includes or is connected to audio circuitry such as, but not limited to, one or more amplifiers, a DSP, voltage converters, voltage regulators, voltage reducers, capacitors, resistors, or the like. In this way, the internal speakers 118 may produce sound based on the audio signals from the head unit 104.

The head unit 104 may provide or generate audio signals from any source such as, but not limited to, an external source (e.g., a mobile device), built-in source (e.g., a built-in compact disc (CD) player, or the like), a satellite radio station, a terrestrial radio station (e.g., a frequency-modulated (FM) radio station, or the like).

The head unit 104 may be factory installed or be an aftermarket product. It is contemplated herein that many vehicles include a factory-installed head unit 104 that provides consolidated display and/or user control over multiple aspects of the vehicle beyond audio playback settings. For example, a head unit 104 may provide consolidated display and/or user control over data such as, but not limited to, engine status, climate control, camera feeds, or vehicle settings in addition to audio playback settings. As another example, a head unit 104 of an EV or hybrid vehicle may include consolidated display and/or user control over data such as, but not limited to, battery life, range, or battery health. In such cases, it may be undesirable and/or impractical to replace the head unit 104 for the purposes of improved audio performance as has been traditionally done for aftermarket audio setups.

In some embodiments, the head unit 104 includes or is coupled with a physical interface in the vehicle to allow a user (e.g., a driver or a passenger) of the vehicle to adjust audio playback settings such as, but not limited to content (e.g., a song, a radio station, a streaming signal, or the like), volume, playback speed, equalization settings, or fade settings. As an illustration, the head unit 104 may include a physical interface installed within the vehicle that may include, but is not limited to, physical buttons, knobs, a touchscreen interface, or any combination thereof. As another illustration, the head unit 104 may be configured to couple via a wired or a wireless connection to an external device suitable for adjusting audio playback settings such as, but not limited to, a mobile device (e.g., a mobile phone, a tablet, or the like).

The T-harness 120 may include any component or combination of components suitable for directing audio signals and/or power from the head unit 104 to the transmitter unit 102. The T-harness 120 may further include any component or combination of components suitable for directing audio signals and/or power from any combination of the head unit 104 or the transmitter unit 102 to the internal speakers 118. Further, the T-harness 120 may be specific to the particular vehicle.

In some embodiments, the transmitter unit 102 includes processing circuitry 124 suitable for manipulating audio signals from the head unit 104 prior to transmission to any of the battery-powered speaker units 106 (e.g., via the wireless communication circuitry 116-T) and/or the internal speakers 118 (e.g., via the T-harness 120).

For example, the audio signals from the head unit 104 may be, but are not required to be, speaker-level signals suitable for directly driving the internal speakers 118. In this way, the audio signals from the head unit 104 may have a wide range of voltages (e.g., +/−9 V, +/−12V, or the like) and/or direct-current (DC) offsets that may be unsuitable for amplification and/or wireless transmission. The processing circuitry 124 may thus include one or more components to transform the speaker-level audio signals to a signal capable of being wirelessly transmitted to the subwoofer and then used by a battery-powered speaker unit 106 (e.g., by an amplifier in a battery-powered speaker unit 106). As an illustration, the processing circuitry 124 may transform the audio signals from the head unit 104 into Radio Corporation of America (RCA) preamp-level signals, which may be suitable for amplification and/or wireless transmission. As an illustration, RCE preamp-level signals may be, but are not required to be, on the order of +/−5V.

The processing circuitry 124 may include any combination of components suitable for manipulating electronic signals using analog and/or digital techniques. For example, the processing circuitry 124 may include discrete components such as, but not limited to, transistors, transformers, rectifiers, resistors, capacitors, inductors, voltage reducers, line out converters (LOCs), or amplifiers. As another example, the processing circuitry 124 may include digital processing components such as, but not limited to, DSPs.

The T-harness 120 may provide or support a variety of configurations between the head unit 104, the transmitter unit 102, and the internal speakers 118.

Figure 2A:
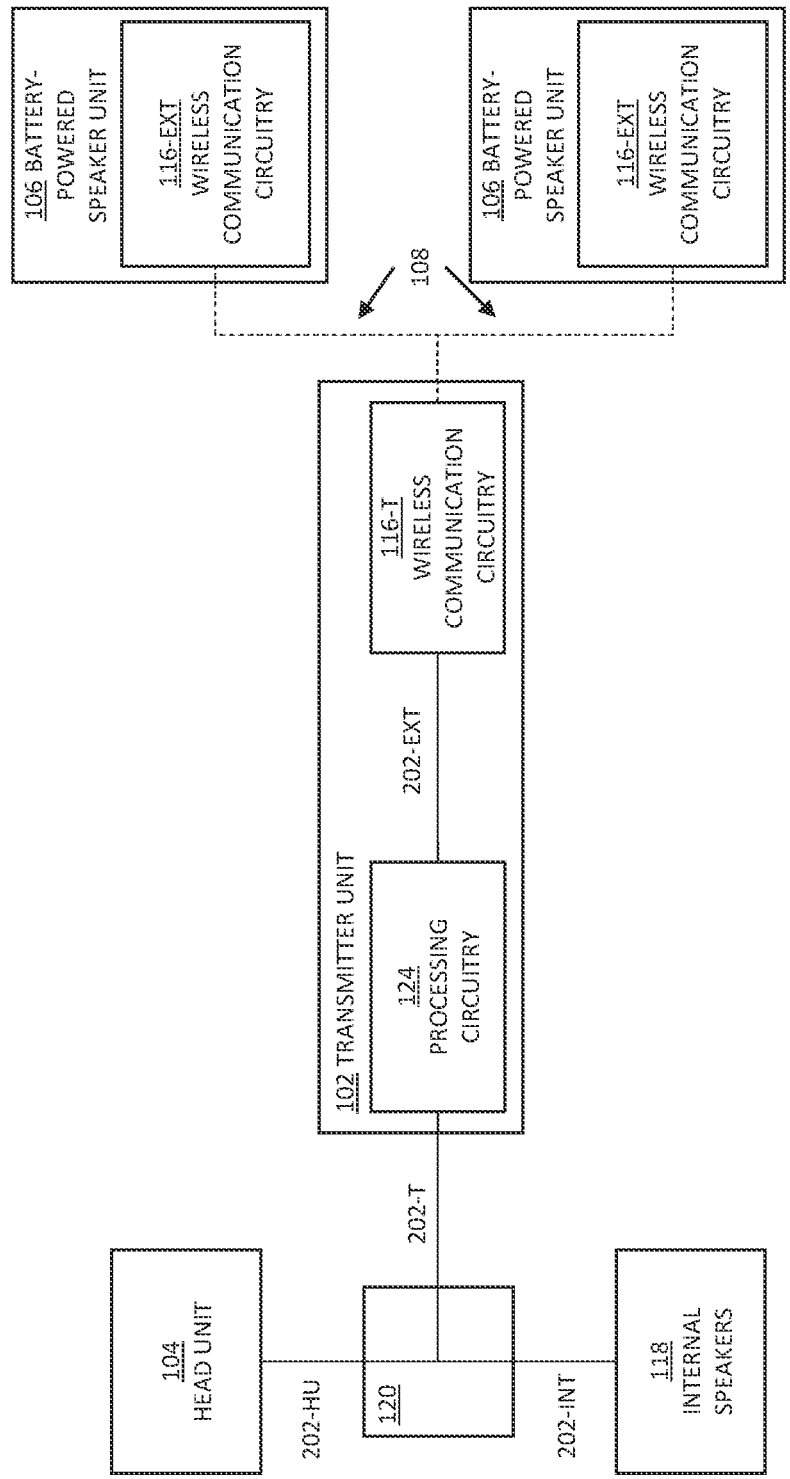
FIG. 2A is a simplified schematic view of a first configuration of a wireless vehicle audio system, in accordance with one or more embodiments of the present disclosure.

FIG. 2A is a simplified schematic view of a first configuration of the wireless vehicle audio system 100, in accordance with one or more embodiments of the present disclosure. In some embodiments, the T-harness 120 splits the audio signal 202-HU from the head unit 104 into a first audio signal 202-T sent to the transmitter unit 102 and a second audio signal 202-INT sent to the internal speakers 118. The T-harness 120 may include any components suitable for splitting the audio signal 202-HU from the head unit 104 such as, but not limited to, a multi-terminal connector or a tap wire connector. In this configuration, the first audio signal 202-T sent to the transmitter unit 102 and the second audio signal 202-INT sent to the internal speakers 118 may include the same information (e.g., the same data associated with sound to be produced), but need not necessarily have the same signal amplitudes. Further, in this configuration, the internal speakers 118 may be fully controlled by the head unit 104 and the operation of the transmitter unit 102 and any connected battery-powered speaker units 106 may supplement the audio provided by the internal speakers 118. For example, the transmitter unit 102 may generate or provide an audio signal 202-EXT (or a processed version thereof) for wireless transmission to one or more battery-powered speaker units 106 for supplemental audio playback.

Figure 2B:
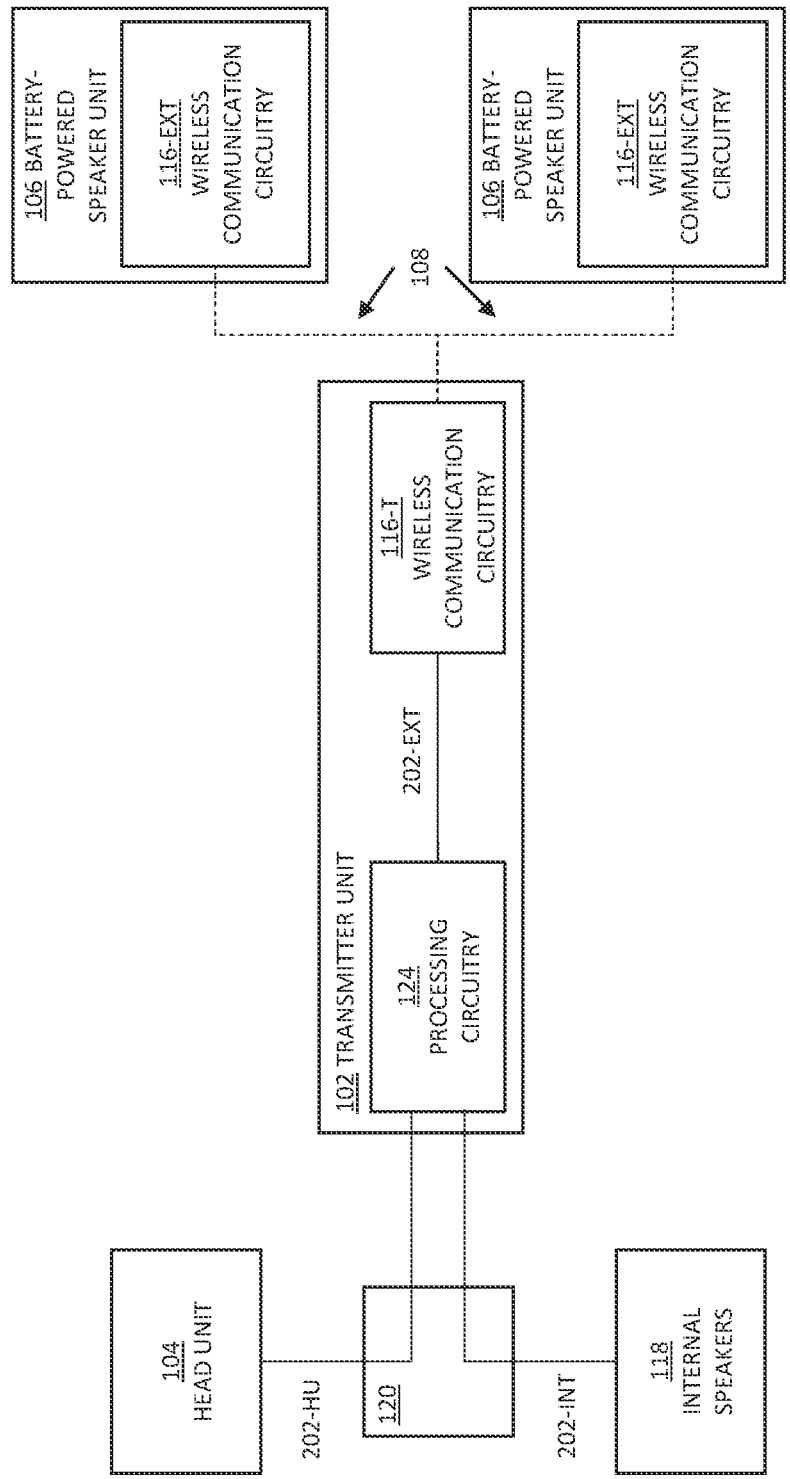
FIG. 2B is a simplified schematic view of a second configuration of a wireless vehicle audio system, in accordance with one or more embodiments of the present disclosure.

FIG. 2B is a simplified schematic view of a second configuration of the wireless vehicle audio system 100, in accordance with one or more embodiments of the present disclosure. In some embodiments, the T-harness 120 directs the audio signal 202-HU from the head unit 104 to the transmitter unit 102 and receives an audio signal 202-INT from the transmitter unit 102. The transmitter unit 102 may further generate or provide an audio signal 202-EXT (or a processed version thereof) for wireless transmission to one or more battery-powered speaker units 106 for supplemental audio playback. In this way, the transmitter unit 102 may manipulate the audio signal 202-INT and thus control the audio for all connected speakers. For example, and as is described in greater detail throughout the present disclosure, the transmitter unit 102 may perform functions such as, but not limited to, amplifying audio signals to any of the internal speakers 118, adjusting volume to any of the internal speakers 118, adjust equalization settings, or synchronize playback between the battery-powered speaker units 106 and the internal speakers 118.

Figure 2C:
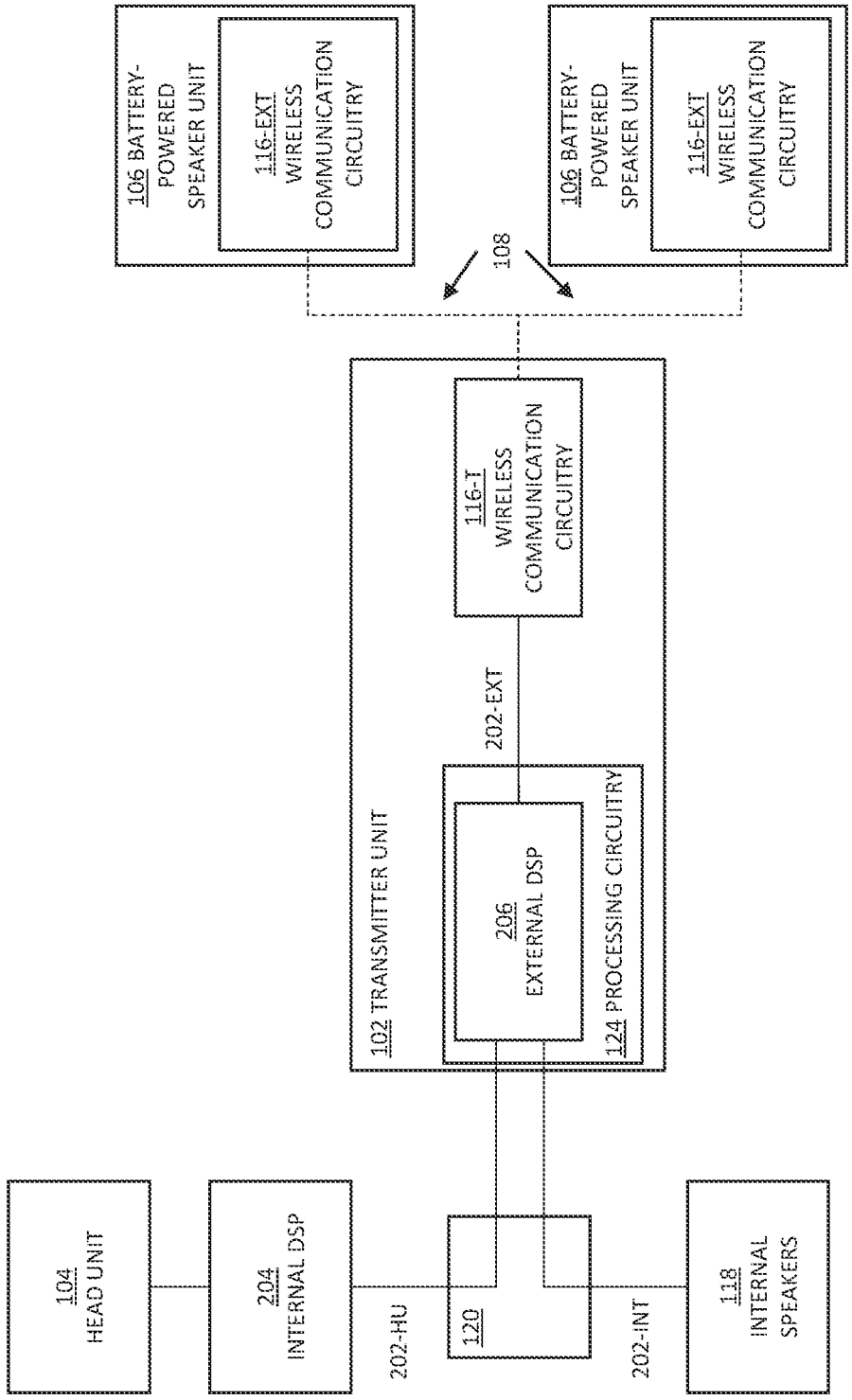
FIG. 2C is a simplified schematic view of a third configuration of a wireless vehicle audio system, in accordance with one or more embodiments of the present disclosure.
Figure 2D:
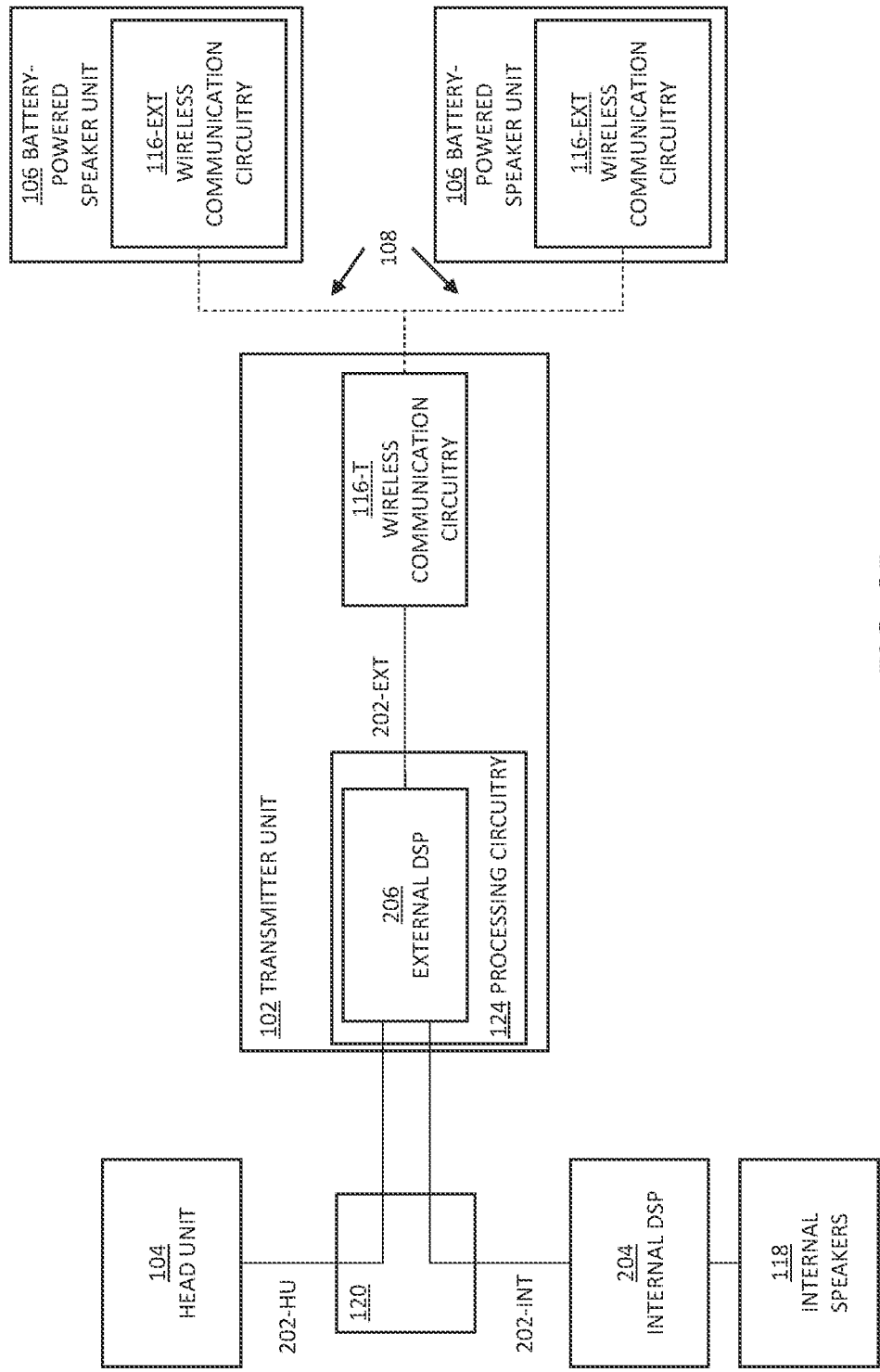
FIG. 2D is a simplified schematic view of a fourth configuration of a wireless vehicle audio system, in accordance with one or more embodiments of the present disclosure.

Referring generally to FIGS. 1-2D, various non-limiting configurations of the transmitter unit 102 are described in greater detail, in accordance with one or more embodiments of the present disclosure.

It is contemplated herein that the transmitter unit 102 (or different models thereof) may provide different features, potentially with different tradeoffs between price, feature set, and complexity. For example, the transmitter unit 102 may simply convert the audio signal 202-HU from the head unit 104 to a form suitable for wireless transmission to one or more battery-powered speaker units 106. As another example, the transmitter unit 102 may convert the audio signal 202-HU from speaker-level voltages to RCA-level voltages suitable for amplification and/or further processing. As another example, the transmitter unit 102 may perform one or more signal processing tasks such as, but not limited to, filtering (e.g., to remove noise or spurious signals) to any combination of the audio signal 202-EXT sent to the battery-powered speaker units 106 or the audio signal 202-INT sent to the internal speakers 118. As another example, the transmitter unit 102 may amplify any combination of the audio signal 202-EXT sent to the battery-powered speaker units 106 or the audio signal 202-INT sent to the internal speakers 118. As another example, the transmitter unit 102 may synchronize audio signals sent to any battery-powered speaker units 106 and/or the internal speakers 118.

In some embodiments, the processing circuitry 124 includes a line output converter (LOC). For example, a LOC may receive speaker-level audio signals from the head unit 104 and transform it into an RCA pre-amp level signal. Such a LOC may be a commercial off the shelf (COTS) device or a custom device tailored for the wireless vehicle audio system 100.

A transmitter unit 102 with a LOC may be implemented in a variety of configurations including, but not limited to the configurations depicted in FIGS. 2A and 2B. For example, a LOC may be a relatively simple and low-cost device that may condition the audio signal 202-HU (or audio signal 202-T) for further processing, amplification, and/or wireless transmission. In this way, the output of the LOC may be associated with the audio signal 202-EXT and/or the audio signal 202-INT.

In some embodiments, the processing circuitry 124 includes a DSP, which may provide a wide range of signal manipulation processes such as, but not limited to, tuning, equalization, filtering, amplification, or synchronization. In this configuration, the processing circuitry 124 may include an ADC to convert the audio signals from the head unit 104 to digital audio signals (e.g., binary signals) and a DSP to manipulate the digital audio signals. Further, the DSP may include or be compatible with one or more additional amplifiers (e.g., single-channel and/or multi-channel amplifiers) at any location in the wireless vehicle audio system 100 such as, but not limited to, the transmitter unit 102, a battery-powered speaker unit 106, or prior to the external speakers 110. Further, the DSP may be controllable via a user interface 122 to provide dynamically adjustable operation in which the user may adjust the operation of the DSP. A transmitter unit 102 with a DSP may be implemented in a variety of configurations including, but not limited to the configurations depicted in FIGS. 2A and 2B.

In some embodiments, a transmitter unit 102 with a DSP may supplement an existing DSP (e.g., an internal DSP) in the vehicle, which may be located at any point between the head unit 104 and the internal speakers 118.

FIG. 2C is a simplified schematic view of a third configuration of the wireless vehicle audio system 100, in accordance with one or more embodiments of the present disclosure. In FIG. 2C, the T-harness 120 is installed between an internal DSP 204 and the internal speakers 118 to direct to the audio signal 202-HU to the transmitter unit 102, which may include an external DSP 206 (e.g., as processing circuitry 124). In this configuration, the external DSP 206 may perform additional processing associated with the audio signal 202-EXT and/or the audio signal 202-INT such as, but not limited to, amplification, synchronization, or other processing functions between any combination of the internal speakers 118 and any battery-powered speaker units 106. Further, the external DSP 206 may also include higher-power amplification and/or more sophisticated processing than the internal DSP 204 and may thus provide an upgraded audio experience using the internal speakers 118 even when battery-powered speaker units 106 are not connected.

FIG. 2D is a simplified schematic view of a fourth configuration of the wireless vehicle audio system 100, in accordance with one or more embodiments of the present disclosure. In FIG. 2D, the T-harness 120 is installed between the head unit 104 and the internal DSP 204. In this configuration, the external DSP 206 and the transmitter unit 102 more generally may operate as described with respect to FIG. 2B, but the internal DSP 204 may perform various additional processing functions on the audio signal 202-INT prior to the internal speakers 118.

Wireless communication between the transmitter unit 102 and the battery-powered speaker units 106 is now described in greater detail, in accordance with one or more embodiments of the present disclosure.

In some embodiments, the wireless vehicle audio system 100 provides wireless communication between the transmitter unit 102 and one or more battery-powered speaker units 106. This wireless communication may be uni-directional from the transmitter unit 102 to a battery-powered speaker unit 106 or may be bi-directional. At a minimum, the transmitter unit 102 may provide wireless audio signals to any connected battery-powered speaker units 106 for audio playback. Bi-directional communication may allow for the transmitter unit 102 to receive information such as, but not limited to, battery levels, power usage, amplifier settings, or operational status.

The wireless vehicle audio system 100 may provide different communication configurations with different battery-powered speaker units 106, which may promote flexible and modular operation. For example, the transmitter unit 102 may provide uni-directional communication with certain battery-powered speaker units 106 and bi-directional communication with others.

The transmitter unit 102 and each battery-powered speaker unit 106 may include components suitable for wireless communication such as, but not limited to, one or more antennas, transmitters, receivers, or transceivers. As an illustration, FIG. 1 depicts wireless communication circuitry 116 on both the transmitter unit 102 and the battery-powered speaker unit 106, which is labeled as wireless communication circuitry 116-T and wireless communication circuitry 116-EXT, respectively.

The wireless communication circuitry 116 on either the transmitter unit 102 or a battery-powered speaker unit 106 may include any combination of components suitable for uni-directional or bi-directional wireless communication. For example, the wireless communication circuitry 116 may include a transmitter, a receiver, and/or a transceiver suitable for bi-directional communication. As another example, the wireless communication circuitry 116 may include one or more antennas. As another example, the wireless communication circuitry 116 may include one or more radios suitable for modulating and/or demodulating wireless audio signals according to a selected protocol.

The transmitter unit 102 and any battery-powered speaker units 106 may communicate over any protocol including, but not limited to, Bluetooth, Bluetooth Low Energy, SKAA, or WiFi. Further, the communications may be unencrypted or decrypted.

The transmitter unit 102 and any battery-powered speaker units 106 may further send and/or receive various wireless signals across the one or more wireless communication channels 108. For example, wireless signals transmitted over the wireless communication channels 108 may include wireless audio signals including raw data associated with sounds to be produced by the external speakers 110. As another example, wireless signals transmitted over the wireless communication channels 108 may include ancillary data associated with audio playback such as, but not limited to, volume information or synchronization data (e.g., delays intended to synchronize playback between various battery-powered speaker units 106 and/or internal speakers 118). In some embodiments, wireless signals transmitted over the wireless communication channels 108 may include control signals associated with the operation and/or status of various components within the wireless vehicle audio system 100 such as, but not limited to, operational status, battery level, or power drain.

In the case of multiple signal types (e.g., data types), the wireless communication circuitry 116 of the transmitter unit 102 may combine different types of data for communication across a single wireless communication channel 108 or may send multiple data streams across different wireless communication channels 108. Accordingly, the wireless communication circuitry 116 of the transmitter unit 102 and/or any battery-powered speaker units 106 may utilize any number of antennas, transmitters, receivers, transceivers, or the like. Further, multiple signal data types may be transmitted synchronously or asynchronously.

Figure 3:
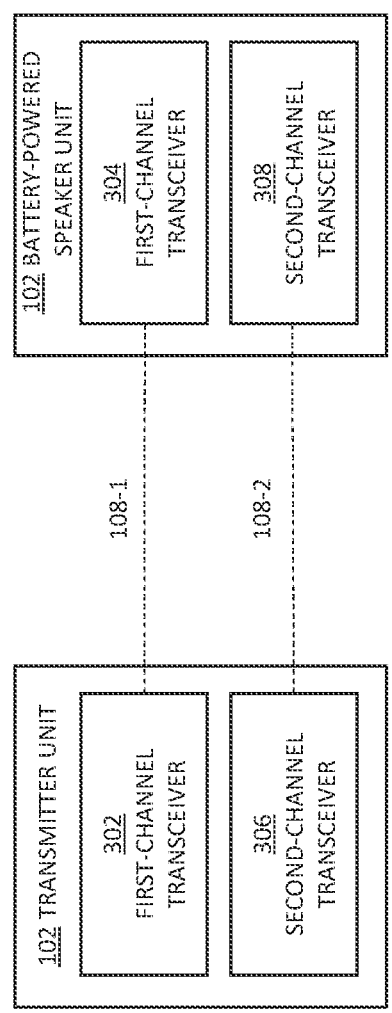
FIG. 3 is a simplified schematic of wireless transmission between a transmitter unit and a battery-powered speaker unit using multiple wireless communication channels, in accordance with one or more embodiments of the present disclosure.

FIG. 3 is a simplified schematic of wireless transmission between a transmitter unit 102 and a battery-powered speaker unit 106 using multiple wireless communication channels 108, in accordance with one or more embodiments of the present disclosure.

In FIG. 3, the transmitter unit 102 includes a first-channel transceiver 302 that may be configured to provide wireless communication with a first-channel transceiver 304 in the battery-powered speaker unit 106 over a first wireless communication channel 108-1. Additionally, the transmitter unit 102 includes a second-channel transceiver 306 that may be configured to provide wireless communication with a second-channel transceiver 308 in the battery-powered speaker unit 106 over a second wireless communication channel 108-2. Any type of data may be transmitted over the wireless communication channels 108-1, 108-2. For example, the first wireless communication channel 108-1 may be used for audio signals, while the second wireless communication channel 108-1 may be used for control signals, status signals, or the like.

It is noted that the configuration depicted in FIG. 3 may be suitable for uni-directional or bi-directional communication across either of the wireless communication channels 108-1, 108-2.

Multi-channel communication may be suitable for various applications. For example, it may be desirable to use specialized transmitters and/or receivers for a particular task such as, but not limited to, audio transmission. As another example, it may be desirable to use different communication protocols for different types of data. As another example, it may be desirable to provide bi-directional communication for certain types of data (e.g., control signals, status signals, or the like), but uni-directional communication for other types of data (e.g., audio signals).

As a non-limiting illustration, the first-channel transceiver 302 in the transmitter unit 102 and the first-channel transceiver 304 in the battery-powered speaker unit 106 may be implemented as SKAA components and designed to transmit audio signals uni-directionally between the transmitter unit 102 and the battery-powered speaker unit 106, whereas the second-channel transceiver 306 and the second-channel transceiver 308 may provide bi-directional communication of additional signals (e.g., control signal, status signals, or the like) via a different protocol.

Figure 4:
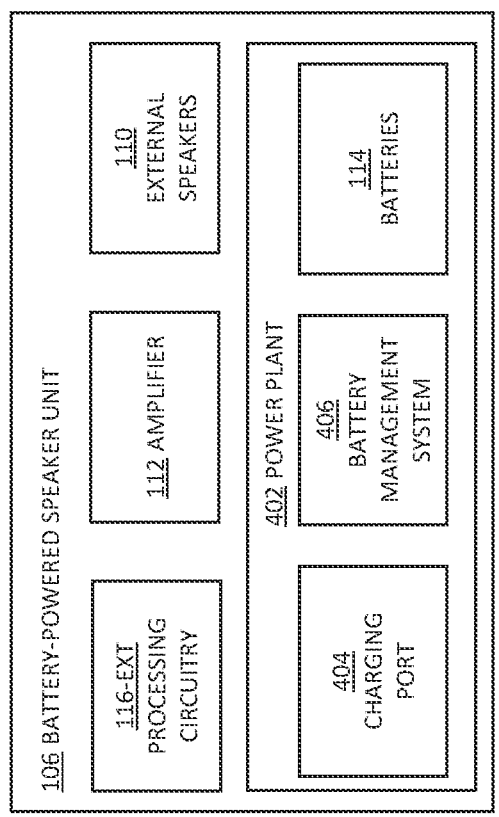
FIG. 4 is a simplified schematic of a battery-powered speaker unit, in accordance with one or more embodiments of the present disclosure.

Referring now to FIG. 4, FIG. 4 is a simplified schematic of a battery-powered speaker unit 106, in accordance with one or more embodiments of the present disclosure.

In some embodiments, a battery-powered speaker unit 106 includes one or more amplifiers 112 to amplify an audio signal (e.g., audio signal 202-EXT) from the wireless communication circuitry 116 for playback on one or more external speakers 110. As described previously herein, a battery-powered speaker unit 106 may generally have any number of external speakers 110 suitable for providing any number of audio channels. Accordingly, the one or more amplifiers 112 may provide single or multi-channel amplification suitable for playback on connected external speakers 110.

Although not shown, the battery-powered speaker unit 106 may further include additional components to manipulate the audio signal (e.g., audio signal 202-EXT) prior to playback on the external speakers 110 such as, but not limited to, a DSP.

In some embodiments, the battery-powered speaker unit 106 includes a power plant 402 that may include batteries 114 as well as associated power management circuitry. For example, the power plant 402 may include a charging port 404 and a battery management system 406 suitable for controlling the charging and/or discharging of the batteries 114.

A battery-powered speaker unit 106 may generally support any number or type of batteries 114 at any voltage or power capacity suitable for powering the internal components. Further, the batteries 114 may be, but are not required to be, rechargeable. In some embodiments, the batteries 114 include lithium iron phosphate (LiFePO4) batteries 114, which may provide relatively high discharge rates. It is further contemplated herein that discharge rate of the batteries 114 may further be improved by using cylindrical instead of square-shaped batteries 114 since a cylindrical design may have a relatively higher discharge rate capability than a square or prismatic design. The batteries 114 may also be enhanced with supercapacitors to bolster instantaneous power delivery, which may be beneficial for certain types of external speakers 110 such as, but not limited to, a subwoofer.

The charging port 404 may include any type of connector and may utilize any type of alternating current (AC) or direct current (DC) power source for charging the batteries 114. In some embodiments, the charging port 404 is configured to recharge the batteries 114 using a 120 V or 240 V AC power source. In this configuration, the charging port 404 may be compatible with a traditional power cord that may be plugged into a traditional 120 V or 240 V AC outlet. In some embodiments, the charging port 404 is configured to allow charging with an EV or hybrid vehicle charging station such as, but not limited to, a charging station compliant with the Tesla North American Charging Standard (NACS). Such a configuration may utilize a power cord that corresponds to the vehicle and may provide convenient charging. In some embodiments, the charging port 404 is configured to connect to the vehicle during charging. Such a configuration may allow for simultaneous charging of the batteries 114 in the battery-powered speaker unit 106 and batteries in the vehicle and/or provide supplemental power while driving (e.g., to the extent allowed by the power headroom of the particular vehicle).

Referring again generally to FIGS. 1-4, the use of control signals for power management is described in greater detail, in accordance with one or more embodiments of the present disclosure.

It may generally be desirable to extend the battery life of a battery-powered speaker unit 106 to the extent possible to allow for long playback times and/or reduced charging cycles.

In some embodiments, the transmitter unit 102 and the battery-powered speaker unit 106 transmit and receive control signals suitable for configuring the battery-powered speaker unit 106. For example, the control signals may include instructions (e.g., operational commands) related to power management of the battery-powered speaker unit 106. Such control signals may utilize any power management scheme. As an illustration, the battery-powered speaker unit 106 may operate in at least two states: a powered state in which the amplifier 112 is powered for receiving and playing audio (e.g., based on audio signals received from the transmitter unit 102) and a standby state suitable for receiving signals from the transmitter unit 102 but in which the amplifier 112 is not powered and thus not suitable for immediate audio playback. In this configuration, the battery-powered speaker unit 106 may switch between the powered and standby states based on control signals from the transmitter unit 102.

In some embodiments, the transmitter unit 102 provides separate "on" and "off" commands directing the battery-powered speaker unit 106 to enter the powered and standby states, respectively. In some embodiments, the battery-powered speaker unit 106 includes an audio signal sensing relay that may allow switching from a standby state to a powered state when an audio signal is detected.

In some embodiments, the transmitter unit 102 provides a continuous "on" command to the battery-powered speaker unit 106 to indicate that the battery-powered speaker unit 106 should be in the powered state, where the battery-powered speaker unit 106 may switch to the standby state when the "on" command is not received for a selected duration.

The strength of the signal carrying the "on" command may be sufficiently low to prevent interference with the audio signal according to a selected metric (e.g., signal to noise ratio (SNR)). To prevent interruptions and power cycling because of difficulties detecting or receiving the weak signal, a holding circuit may be used. The holding circuit may only be used once the wireless signal receiver begins receiving an audio signal from the wireless signal transmitter. The holding circuit may act in a way so that even if the signal carrying the on command is not detected or received by the battery-powered speaker unit 106, the battery-powered speaker unit 106 continues to operate as though the signal were received. The holding circuit may have a threshold level, so that if the volume of the subwoofer falls below a certain level (e.g., a volume threshold), the holding circuit will no longer cause the battery-powered speaker unit 106 to act as though the "on" command is being received.

A time delay circuit may be used to further reduce interruptions and power cycling in the battery-powered speaker unit 106 when volume levels are turned down to a point below the holding circuit's threshold. While power is coming through the circuit, capacitors in the time delay circuit may charge in order to power the battery-powered speaker unit 106 temporarily if the on command is not detected or the volume drops below the holding circuit's threshold.

For example, the battery-powered speaker unit 106 may receive the "on" command to turn on the battery-powered speaker unit 106, at which point the holding circuit may be enabled. At some time during use, the battery-powered speaker unit 106 may receive or detect the on command from the transmitter unit 102. At this time, the holding circuit may engage to keep the battery-powered speaker unit 106 in a powered state. However, if a user decides to turn down the volume, the holding circuit may disengage. If the holding circuit disengages, the time delay circuit may engage and power the battery-powered speaker unit 106 for a selected time (e.g., a time corresponding to the charge built up in the time delay circuit). If the user turns the volume back up to a level above the volume threshold, the holding circuit may reengage and if the "on" command is redetected at any point, the battery-powered speaker unit 106 may return to operating without the aid of the holding circuit or time delay circuit.

Still referring generally to FIGS. 1-4, synchronization of audio between all connected speakers is described in greater detail, in accordance with one or more embodiments of the present disclosure.

The wireless vehicle audio system 100 may synchronize playback on all connected speakers using a variety of techniques. As previously discussed herein, the wireless vehicle audio system 100 may synchronize playback by delaying (e.g., buffering) audio signals to the internal speakers 118 and/or any of connected battery-powered speaker units 106. Further, such delays may be implemented by any combination of the transmitter unit 102 or battery-powered speaker units 106.

It is contemplated herein that audio delays may be beneficial to compensate for differences in signal latency times (e.g., signal transmission times) between the head unit and the various internal and external speakers. Further, an acceptable amount of latency between sounds produced by different speakers may generally vary based on the user, the audio content (e.g., the music style), cost considerations, or the like.

For example, it may be the case that wireless transmission of audio signals from the transmitter unit 102 to a battery-powered speaker unit 106 may result in a delay (e.g., latency) between the sound produced by the battery-powered speaker unit 106 and sound produced by the internal speakers 118, which may be discernable to a user. In this case, the transmitter unit 102 may introduce a delay to audio signals 202-INT sent to the internal speakers 118 to compensate for latency associated with wireless transmission of audio signals 202-EXT to the battery-powered speaker units 106.

As another example, it may be the case that different battery-powered speaker units 106 may exhibit different latency times with respect to each other and/or the internal speakers 118. In this case, the transmitter unit 102 may introduce different delays to different battery-powered speaker units 106. As an illustration, the latency associated with a particular battery-powered speaker unit 106 may depend on the strength and/or reliability of a wireless connection to the transmitter unit 102. As another illustration, different battery-powered speaker units 106 may utilize different hardware and/or communication protocols, which may result in different latencies. For instance, audio-specific protocols such as, but not limited to, SKAA may have a relatively low latency compared with alternative protocols such as, but not limited to, Bluetooth. Accordingly, in some embodiments, a transmitter unit 102 may provide protocol-specific delays to facilitate synchronization between battery-powered speaker units 106 using different communication protocols.

Audio delays may be implemented by any components within the transmitter unit 102 and/or any connected battery-powered speaker units 106.

In some embodiments, the processing circuitry 124 of the transmitter unit 102 introduces time delays to audio signals directed to selected components (e.g., the internal speakers 118 and/or any of the battery-powered speaker units 106). For example, in a configuration where the processing circuitry 124 of the transmitter unit 102 includes a DSP, the DSP may perform synchronization options. As another example, the processing circuitry 124 of the transmitter unit 102 may include standalone synchronization circuitry (e.g., static or adjustable delay circuits). Such a configuration may be suitable for, but not limited to, a configuration where the processing circuitry 124 of the transmitter unit 102 includes a LOC without a DSP.

In some embodiments, although not explicitly shown, a battery-powered speaker unit 106 includes circuitry suitable for introducing a delay prior to playback. For example, a transmitter unit 102 may transmit an audio delay time (e.g., an operational command associated with an audio delay time) to a battery-powered speaker unit 106 such that the battery-powered speaker unit 106 may implement the delay internally. Such a configuration may offload processing power of implementing the delay to the battery-powered speaker unit 106 and may be particularly beneficial for, but not limited to, configurations with multiple battery-powered speaker units 106 having different latencies. In particular, such a configuration would reduce a number of components and/or processing power required by the transmitter unit 102 to implement multiple delays. As an illustration, a transmitter unit 102 may implement a first delay for the internal speakers 118 that is equal to or longer than a longest expected latency associated with wireless transmission. The transmitter unit 102 may then transmit desired values of additional delay times as control signals to any of the battery-powered speaker units 106 as necessary. For instance, additional delay times may transmitted as control signals to battery-powered speaker units 106 with relatively shorter latencies. In this way, the transmitter unit 102 need only implement a single delay and the battery-powered speaker unit 106 may implement additional delays as needed.

However, it is noted that synchronization may not be necessary in all embodiments of the wireless vehicle audio system 100. In this way, different models of various components of the wireless vehicle audio system 100 may offer different levels or techniques for synchronization. As an illustration, it may be the case that a wireless transmission protocol dedicated for low-latency audio transmission such as, but not limited to SKAA, may have a sufficiently low latency that synchronization is not necessary for some applications or user preferences. In this case, a transmitter unit 102 with processing circuitry 124 including a simple LOC may be sufficient. Further, such a transmitter unit 102 may additionally include a fixed-buffer circuit providing a fixed audio delay. However, more advanced synchronization controls may be provided by upgrading the transmitter unit 102 to a model that includes a DSP (or other synchronization circuitry). Similarly, different models of battery-powered speaker units 106 may be provided with different synchronization options as described above.

Additionally, the delays used for synchronization of any particular audio signal may be static or dynamic. In some embodiments, the transmitter unit 102 may provide a fixed delay to the audio signal 202-INT to the internal speakers 118 to provide compensation for an expected latency associated with wireless communication. In this case, deviations of the actual latency may be acceptable. In some embodiments, the transmitter unit 102 and/or a battery-powered speaker unit 106 may provide a user-selectable delay for one more audio signals (e.g., selectable via the user interface 122). In this way, various delays may be adjusted based on the particular aspects of the hardware used and/or the vehicle. In some embodiments, the delay associated with one or more audio signals may be dynamically adjusted based on measurements. For example, the transmitter unit 102, a battery-powered speaker unit 106, and/or an external sensor may measure temporal differences between sound from different internal or external speakers, which may be used to dynamically modify any audio delays.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A wireless audio device comprising:
   a transmitter unit configured to receive audio signals from a head unit of a vehicle through a T-harness, wherein the transmitter unit is configured to be powered by the vehicle, wherein the transmitter unit includes wireless communication circuitry configured to wirelessly transmit at least a portion of the audio signals to one or more battery-powered speaker units, wherein at least one of the one or more battery-powered speaker units comprises:
      additional wireless communication circuitry configured to receive the audio signals from the transmitter unit;
      one or more amplifiers to amplify the audio signals; and
      one or more speakers configured to produce sound based on the audio signals.

2. The wireless audio device of claim 1, wherein the transmitter unit further comprises:
   a line output converter (LOC) configured to at least one of rectify the audio signals or reduce a voltage of the audio signals.

3. The wireless audio device of claim 1, wherein the transmitter unit further comprises:
   a digital signal processor (DSP).

4. The wireless audio device of claim 3, wherein the DSP manipulates the audio signals to one or more internal speakers in the vehicle or the audio signals transmitted by the wireless communication circuitry, wherein the manipulation includes at least one of synchronization, filtering, equalization, or amplification.

5. The wireless audio device of claim 1, wherein the T-harness routes the audio signals from the head unit to the transmitter unit, wherein the transmitter unit is further configured to transmit the audio signals to one or more internal speakers in the vehicle.

6. The wireless audio device of claim 5, wherein the transmitter unit synchronizes the one or more internal speakers in the vehicle and the one or more battery-powered speaker units.

7. The wireless audio device of claim 5, wherein the transmitter unit further comprises:
   an amplifier configured to amplify the portion of the audio signals sent to the one or more internal speakers in the vehicle.

8. The wireless audio device of claim 1, wherein the T-harness routes the audio signals to the transmitter unit and one or more internal speakers in the vehicle.

9. The wireless audio device of claim 8, wherein the transmitter unit synchronizes the one or more battery-powered speaker units.

10. The wireless audio device of claim 1, wherein the transmitter unit and the one or more battery-powered speaker units establish one or more wireless communication channels for communicating at least one of control signals including operational commands or status signals including operational status, wherein any of the one or more wireless communication channels may be uni-directional or bi-directional.

11. The wireless audio device of claim 10, wherein at least one of the operational commands includes a power command, wherein at least one of the one or more battery-powered speaker units operates in a powered on state suitable for audio playback when the power command is received and operate in a standby state unsuitable for audio playback when the power command is not received for a selected duration.

12. The wireless audio device of claim 10, wherein at least one of the operational commands includes an audio delay command, wherein at least one of the one or more battery-powered speaker units delays the audio signals to the one or more speakers based on the audio delay command.

13. A battery-powered speaker unit comprising:
   one or more batteries to provide power during operation;
   wireless communication circuitry configured to receive audio signals from a transmitter unit, wherein the transmitter unit is configured to receive the audio signals from a head unit of a vehicle through a T-harness;
   one or more amplifiers to amplify the audio signals; and
   one or more speakers configured to produce sound based on the audio signals.

14. The battery-powered speaker unit of claim 13, wherein at least one of the one or more speakers comprises:
   a subwoofer.

15. The battery-powered speaker unit of claim 13, wherein at least one of the one or more speakers comprises:
   a full-range speaker.

16. The battery-powered speaker unit of claim 13, wherein the T-harness routes the audio signals from the head unit to the transmitter unit, wherein the transmitter unit is further configured to transmit the audio signals to one or more internal speakers in the vehicle.

17. The battery-powered speaker unit of claim 16, wherein the transmitter unit synchronizes the one or more internal speakers in the vehicle and the one or more speakers in the battery-powered speaker unit.

18. The battery-powered speaker unit of claim 13, wherein the T-harness is configured to route the audio signals to the transmitter unit and one or more internal speakers in the vehicle.

19. The battery-powered speaker unit of claim 18, wherein the transmitter unit synchronizes the one or more speakers in the battery-powered speaker unit and one or more additional battery powered speaker units.

20. The battery-powered speaker unit of claim 13, wherein the transmitter unit and the wireless communication circuitry establish one or more wireless communication channels for communicating at least one of control signals including operational commands or status signals including operational status, wherein any of the one or more wireless communication channels may be uni-directional or bi-directional.

21. The battery-powered speaker unit of claim 20, wherein the of the operational commands include a power command, wherein the battery-powered speaker unit operates operate in a powered on state suitable for audio playback when the power command is received and operate in a standby state unsuitable for audio playback when the power command is not received for a selected duration.

22. The battery-powered speaker unit of claim 20, wherein at least one of the operational commands includes an audio delay command, wherein the battery-powered speaker unit delays the audio signals to the one or more speakers based on the audio delay command.

23. A wireless audio system comprising:
a transmitter unit configured to receive audio signals from a head unit of a vehicle through a T-harness, wherein the transmitter unit is configured to be powered by the vehicle, wherein the transmitter unit includes wireless communication circuitry configured to wirelessly transmit the audio signals; and
one or more battery-powered speaker units, each powered by one or more batteries during operation, wherein at least one of the one or more battery-powered speaker units comprises:
additional wireless communication circuitry configured to receive the audio signals from the transmitter unit;
one or more amplifiers to amplify the audio signals; and
one or more speakers configured to produce sound based on the audio signals.

24. The wireless audio system of claim 23, wherein at least one of the wireless communication circuitry or the additional wireless communication circuitry comprises:
at least one of an antenna, a transmitter, a receiver, or a transceiver.

* * * * *